US008578690B2

(12) United States Patent
Hoerner

(10) Patent No.: US 8,578,690 B2
(45) Date of Patent: Nov. 12, 2013

(54) HAYMAKING MACHINE PROVIDED WITH A HITCHING DEVICE WITH AN INCLINED PIVOTING AXIS

(75) Inventor: Yannick Hoerner, Erstroff (FR)

(73) Assignee: Kuhn S.A., Saverne (FR)

( * ) Notice: Subject to any disclaimer, the term of this patent is extended or adjusted under 35 U.S.C. 154(b) by 0 days.

(21) Appl. No.: 13/464,221

(22) Filed: May 4, 2012

(65) Prior Publication Data

US 2012/0297744 A1 Nov. 29, 2012

(30) Foreign Application Priority Data

May 24, 2011 (FR) ...................................... 11 54505

(51) Int. Cl.
*A01D 43/00* (2006.01)
*A01D 57/00* (2006.01)
(52) U.S. Cl.
USPC .............................. 56/192; 172/311; 280/494
(58) Field of Classification Search
USPC ......... 280/494, 492, 496, 501, 477, 511, 412, 280/491.1, 416.1; 172/311, 313, 439; 56/192
See application file for complete search history.

(56) References Cited

U.S. PATENT DOCUMENTS

| 2,163,999 | A | * | 6/1939 | Jacks | 280/492 |
| 3,679,232 | A | * | 7/1972 | Weber | 280/406.2 |
| 3,731,950 | A | * | 5/1973 | Burcham | 280/406.2 |
| 5,154,240 | A | * | 10/1992 | Carrick | 172/311 |
| 5,355,963 | A | * | 10/1994 | Boyko et al. | 172/383 |
| 5,465,991 | A | * | 11/1995 | Kass et al. | 280/457 |
| 5,816,339 | A | * | 10/1998 | Parsons et al. | 172/449 |
| 6,142,500 | A | * | 11/2000 | Sargent | 280/405.1 |
| 6,460,870 | B2 | * | 10/2002 | Moss | 280/491.3 |
| 6,536,793 | B2 | * | 3/2003 | Sargent | 280/455.1 |
| 6,712,381 | B1 | * | 3/2004 | Moss | 280/491.1 |
| 7,021,643 | B1 | * | 4/2006 | Buchanan | 280/416.1 |
| 7,819,416 | B2 | * | 10/2010 | Moss | 280/491.1 |
| 8,118,323 | B2 | * | 2/2012 | Hudson | 280/494 |
| 8,328,222 | B1 | * | 12/2012 | Roeber et al. | 280/455.1 |
| 2010/0225092 | A1 | * | 9/2010 | Hudson | 280/494 |

FOREIGN PATENT DOCUMENTS

| FR | 2 686 481 | 7/1993 |
| FR | 2 751 165 | 1/1998 |
| FR | 2 778 311 | 11/1999 |
| FR | 2 819 374 | 7/2002 |

OTHER PUBLICATIONS

French Preliminary Search Report and Written Opinion issued Jan. 11, 2012, in French 1154505, filed May 24, 2011 (with English Translation of Categories of Cited Documents).

* cited by examiner

*Primary Examiner* — Árpád Fábián-Kovács
(74) *Attorney, Agent, or Firm* — Oblon, Spivak, McClelland, Maier & Neustadt, L.L.P.

(57) ABSTRACT

An agricultural haymaking machine intended to be hitched to the lower arms of a tractor comprises a frame supported on the ground by wheels and at least one work device connected to the frame, the frame being in its front part in pivoting connection with a hitching device configured to be connected to the two lower arms, the center of gravity of the machine being situated between the wheels and the hitching device. According to the invention, the projection of the axis of the pivoting connection, on a plane which is substantially vertical and substantially parallel to the direction of advance, has an inclination towards the direction of advance following a direction of the ground upward.

13 Claims, 8 Drawing Sheets

HAYMAKING MACHINE PROVIDED WITH A HITCHING DEVICE WITH AN INCLINED PIVOTING AXIS

BACKGROUND OF THE INVENTION

1. Field of the Invention

The present invention relates to an agricultural haymaking machine intended to be hitched to the lower arms of a tractor and comprising:
- a frame supported on the ground by wheels,
- at least one work device connected to the frame, the frame being in pivoting connection in its front part with a hitching device configured to be connected to the two lower arms, the center of gravity of the machine being situated between the wheels and the hitching device.

2. Discussion of the Background

Such a machine is known from the document FR 2 778 311. This document describes a windrowing machine of the semi-mounted type which comprises a frame, the front part of which is in pivoting connection with a hitching device configured to be hitched to the two lower arms situated at the rear of a tractor. The pivoting connection has a substantially vertical axis. The frame is supported in its rear part by two wheels. Two work devices are articulated on the frame, one is arranged with respect to the frame on the left-hand side in the direction of advance and the other on the right-hand side, and each comprises its own train of wheels which has been chosen to be designated as carrier wheels in the rest of the text so as to distinguish them from the wheels supporting the rear part of the frame. Each of the work devices can be moved between a work position, in which it extends laterally following a direction substantially perpendicular to the direction of advance, and a transport position in which it is raised substantially to the vertical.

The machine previously described presents a certain number of drawbacks, the exposition of which requires a recollection of the definition of the sustentation triangle. This imaginary triangle has a first side formed by a vertical plane connecting the center of the left wheel to the center of the right wheel. It has a second side which, when the machine is in a straight line, is formed by a vertical plane passing through the center of the left wheel and through the articulation between the hitching device and the lower left arm of the tractor, whilst the third side is formed by a vertical plane passing through the center of the right wheel and through the articulation between the hitching device and the lower right arm of the tractor. On a substantially flat terrain and in a straight line, the center of gravity of the machine is located inside the sustentation triangle. However, when the machine undergoes a lateral acceleration, it can occur that the machine rests on only one of the lower arms, in which case the previously described machine has a major defect. By way of example, if the machine undergoes a lateral acceleration oriented towards the left, it remains stable if it rests on the lower left arm, whereas it risks tilting if it rests on the lower right arm. Now, the fact that the above-mentioned pivoting connection has a substantially vertical axis prevents a prediction being made as to which of the lower arms the machine will rest on when it undergoes a lateral acceleration. This uncertainty represents a risk for the stability of the machine, which is aggravated by the fact that, when the machine is in the transport position, its center of gravity is situated at a great distance from the ground owing to the vertical extension of the work devices.

During transport, the machine can be brought to follow a curved course, for example on cornering or on a half-turn at the end of the plot of land. In this situation, the centrifugal force can cause the center of gravity to leave the sustentation triangle, which causes the lateral tilting of the machine. This phenomenon is all the more marked, the greater the running speed and the smaller the radius of curvature of the course. The phenomenon will be further aggravated if the maneuver is carried out on a field having numerous hollows and bumps, or again on a sloping field and where the side of the machine situated towards the exterior of the curved course is lower, due to the slope, than the opposite side. The result of this is that the farmer must slow the tractor down greatly on turns. In addition, he must operate the half-turn maneuvers at a substantially reduced speed and/or with a large turning radius, the latter generating additional maneuvers.

During work, such a machine often allows the work devices to be raised a small distance from the ground so that they do not come in contact with the fodder lying on the ground. In this raised position, the train of carrier wheels of each work device does not touch the ground. The result of this is that the only wheels which carry the machine are those at the rear of the frame. But, the work devices in the raised position extend laterally much more than the wheels at the rear of the frame. Thus, when the machine follows a curved course, it is even more easily destabilized than in the transport position. To reduce this risk, the farmer must travel at a reduced speed over his plot of land, which slows him down in his work.

SUMMARY OF THE INVENTION

The machine according to the invention proposes overcoming the above-mentioned drawbacks.

To this end, an important feature of the invention lies in the fact that the projection of the axis of the pivoting connection on a plane substantially vertical and substantially parallel to the direction of advance, has an inclination towards the direction of advance following a direction of the ground upward.

The result of this is that when the frame pivots with respect to the hitching device about this axis so as to follow a curved course, the end of the hitching device situated on the interior side of the course is at a greater height than the opposite end, which generates a greater support on the lower arm situated on the exterior side of the course, whereas the lower arm situated on the interior side of the course is relieved. The sustentation triangle is then forced to pass through the articulation between the hitching device and the lower arm situated on the exterior side of the course. This reduces the risk that, under the effect of a lateral acceleration such as centrifugal acceleration, the center of gravity leaves the sustentation triangle and that the machine tilts towards the exterior of the course.

Another important feature of the invention consists in that the hitching device comprises a hitching piece and two yokes, that the hitching piece is articulated on one hand on the frame by the pivoting connection and on another hand on the yokes, and that the yokes are configured such that they can articulate on the two lower arms.

The machine can then advantageously be hitched to a tractor, the lower arms of which are held parallel to each other. In addition, the yokes allow the axis of the pivoting connection to be greatly inclined towards the front, which contributes to an improvement of the overall efficiency of the invention. Furthermore, through the additional degree of freedom which they give to the hitching device in its movements with respect to the lower arms, the yokes reduce the torsional stresses which exert on the frame, and extend the lifespan of the machine.

BRIEF DESCRIPTION OF THE DRAWINGS

Other features and advantages of the invention will emerge from the following description with reference to the attached drawings which represent, by way of non-restrictive example, several embodiments of the agricultural machine according to the invention.

In these drawings.

DESCRIPTION OF THE PREFERRED EMBODIMENT

Figure 1:
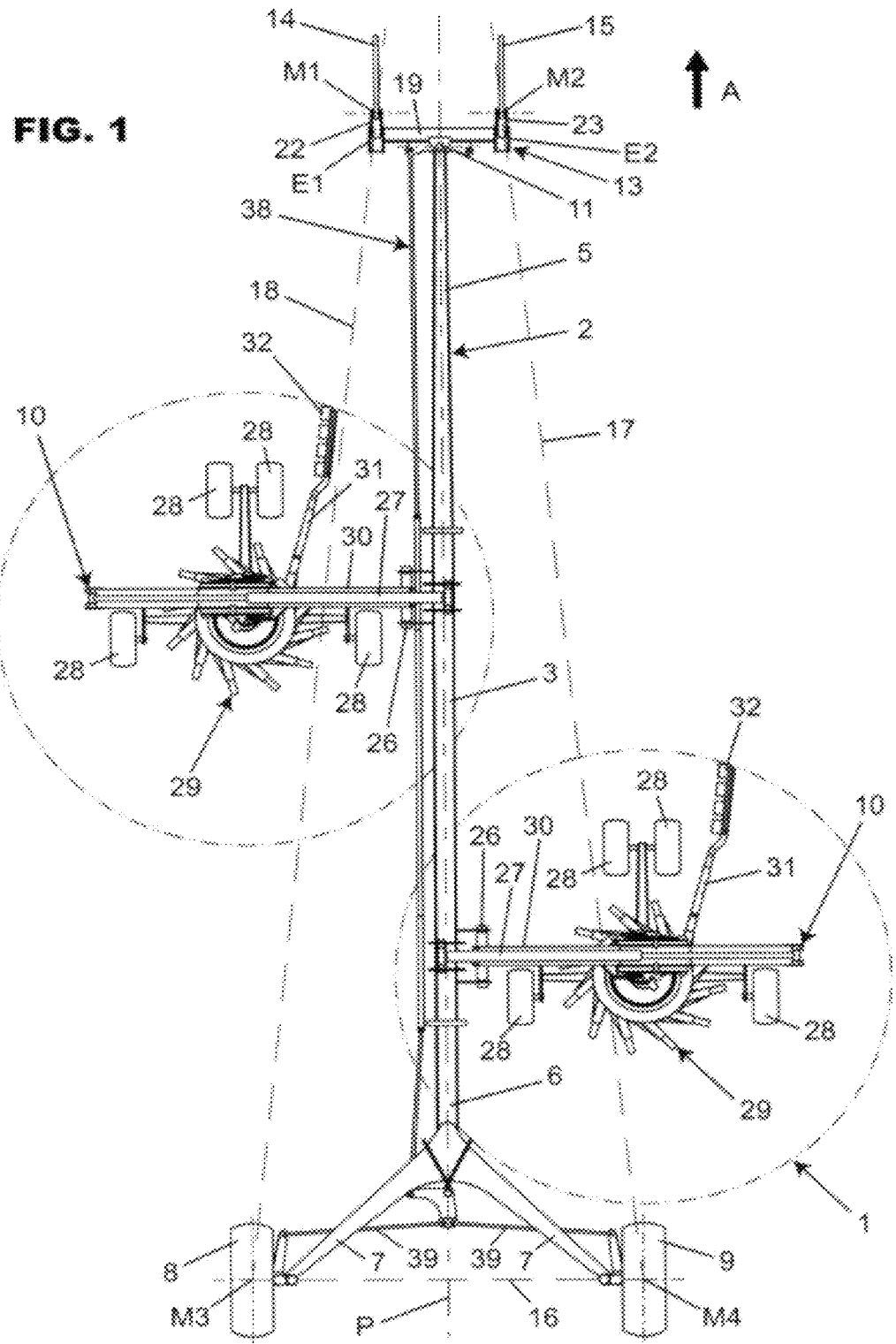
FIG. 1 represents a top view of a machine according to the invention, in a straight line.

As can be seen from FIG. 1, the machine 1 according to the invention comprises a frame 2. The latter comprises a central beam 3 which is substantially horizontal. In the variant embodiment presented in FIGS. 1 to 3, the central beam 3 is extended in its part situated towards the tractor 4—represented partially in FIG. 3—by a front beam 5 rigidly linked to the central beam 3 and which is inclined towards the ground. At its rear end, the central beam 3 is extended by a rear beam 6 rigidly linked to the central beam 3 and which is inclined towards the ground. The rear beam 6 is rigidly fastened to two divergent supports 7 each having a wheel 8, 9 which rests on the ground. The machine 1 according to the invention could comprise more than two wheels. At least one work device 10 is connected to the central beam 3. The tractor 4 serves to move the machine in a direction of advance A and to drive the work devices 10. The front beam 5 has a pivoting connection 11 having an axis 12 with a hitching device 13 configured to be connected to the two lower arms 14, 15 of the tractor 4. In addition, the center of gravity of the machine 1 is situated between the wheels 8, and the hitching device 13. This feature is respected whatever the number, form and arrangement of the work device or devices 10. It guarantees that the machine 1 is always resting on at least one of the lower arms 14, 15.

Figure 2:
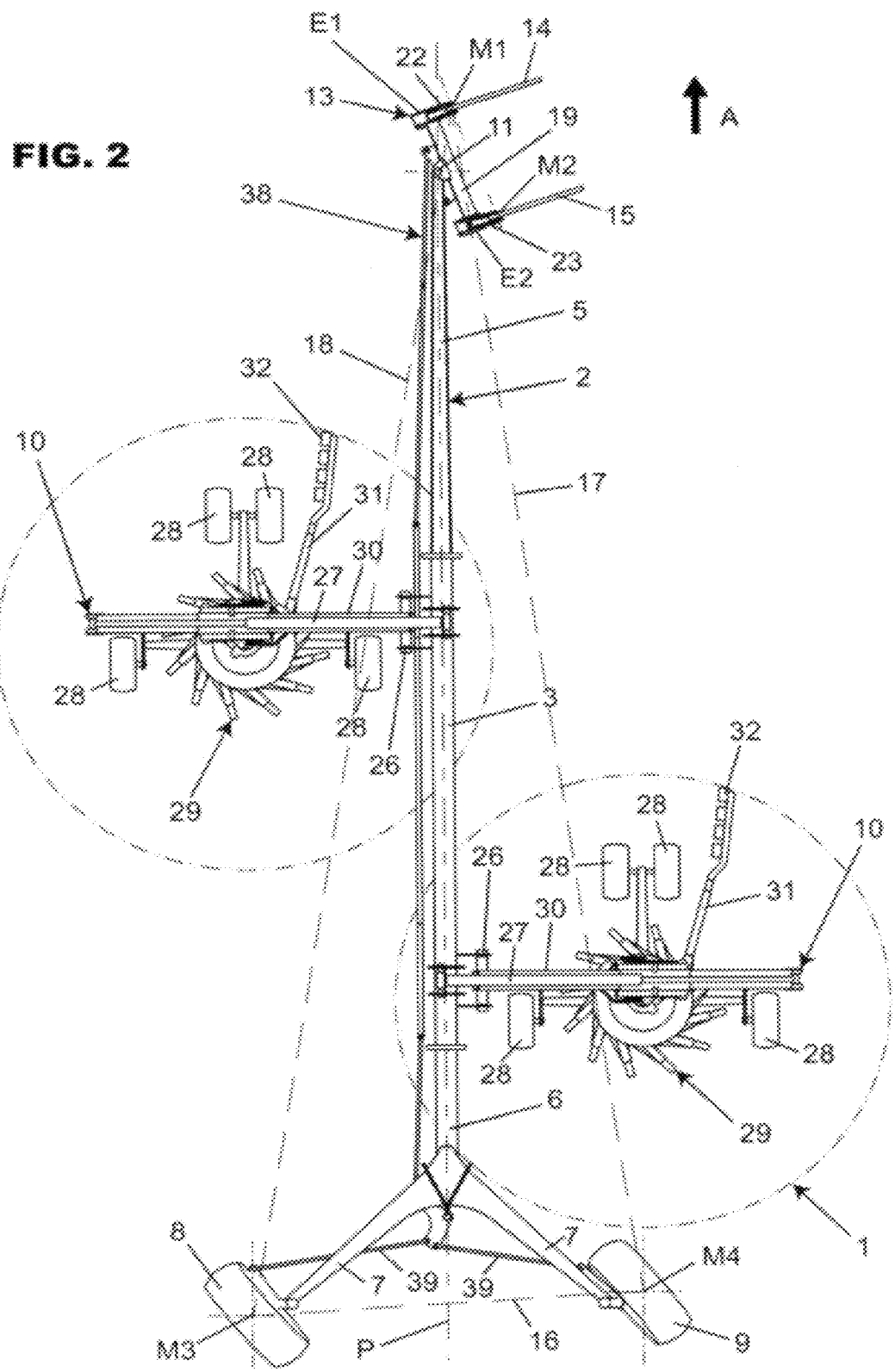
FIG. 2 represents a top view of a machine according to the invention with the hitching device and the wheels turned so as to follow a curved course towards the right.
Figure 3:
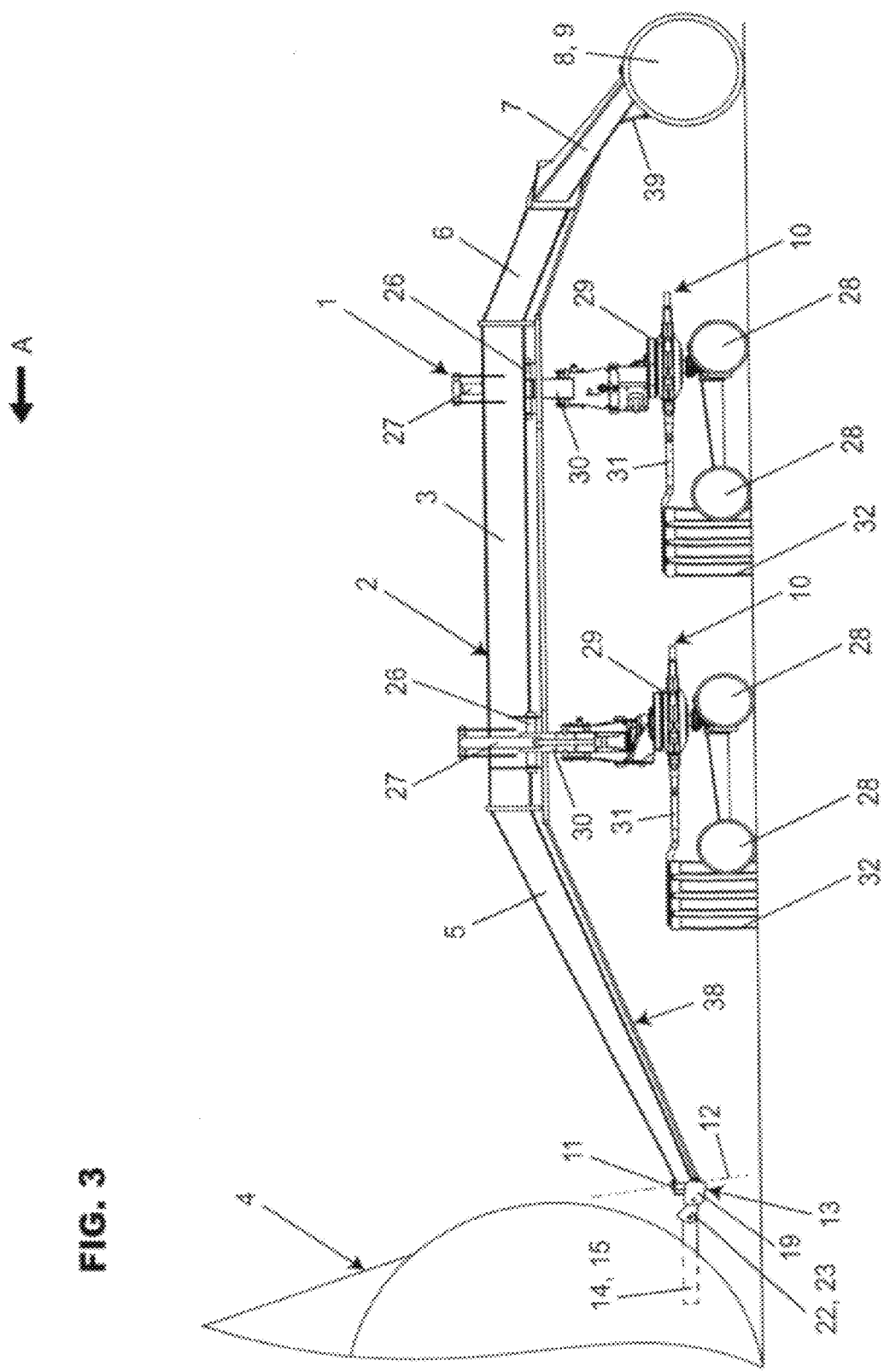
FIG. 3 represents a left view of a machine according to the invention in a straight line, hitched to a tractor.

As can be seen in FIGS. 1 and 2, the sustentation triangle is defined by a first side 16, a second side 17 and a third side 18. The articulation between the hitching device 13 and the lower arm 14 situated on the left in the direction of advance A has a center M1. The articulation between the hitching device 13 and the lower arm 15 situated on the right in the direction of advance A has a center M2. The wheel 8 has a center M3 and the wheel 9 a center M4. The first side 16 connects the center M3 to the center M4. When the machine is in a straight line, as represented in FIG. 1, the second side 17 connects the center M2 to the center M4, whilst the third side 18 connects the center M1 to the center M3. The hitching device 13 comprises a hitching piece 19 which extends between a first end E1 and a second end E2.

Figure 4:
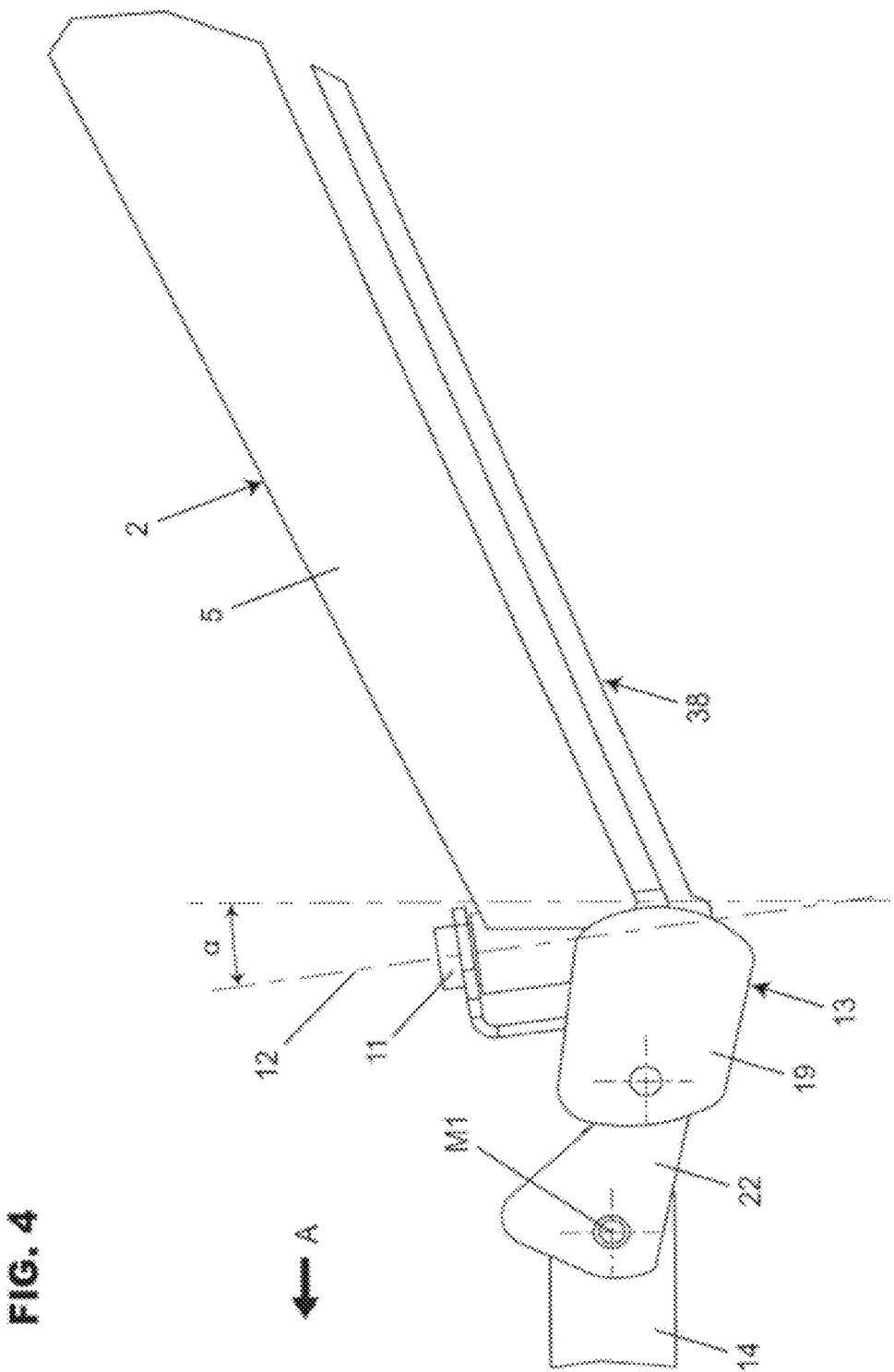
FIG. 4 represents on a larger scale a partial left view of a machine according to the invention, in a straight line.
Figure 5:
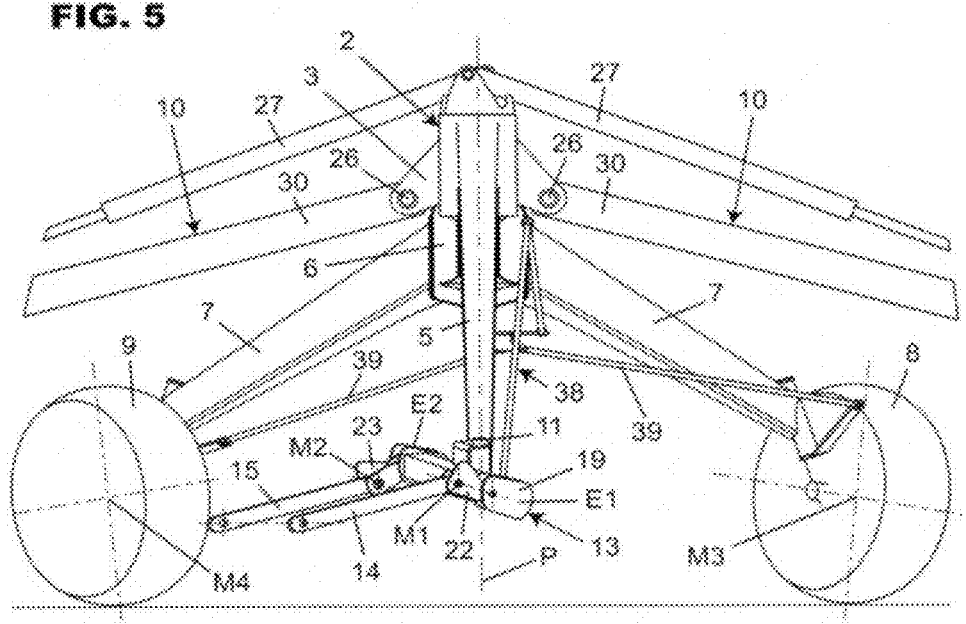
FIG. 5 represents on a larger scale a partial front view of a machine according to the invention, the hitching device of which is a variant embodiment, the hitching device and the wheels being turned so as to follow a curved course towards the right.
Figure 6:
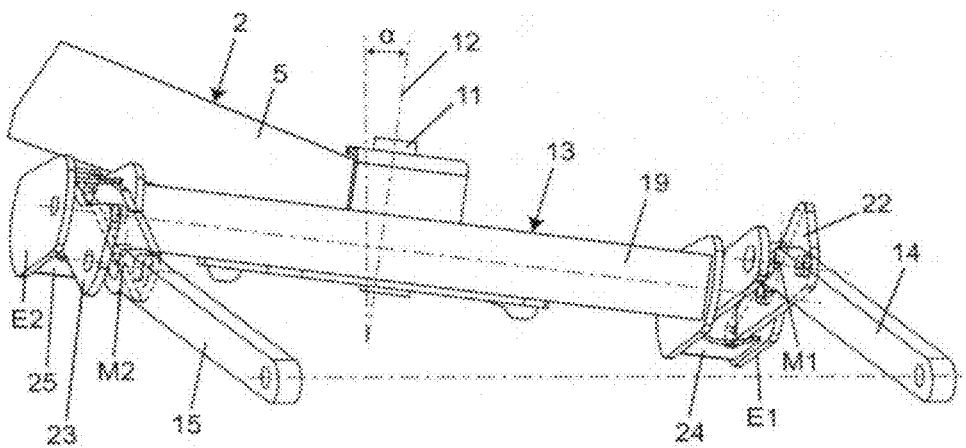
FIG. 6 represents on a larger scale a partial right view of a machine according to the invention, the hitching device of which follows the variant embodiment of FIG. 5, the hitching device and the wheels being turned so as to follow a curved course towards the right.

FIG. 1 shows a plane P substantially vertical and substantially parallel to the direction of advance A. As FIG. 4 shows, the projection of the axis 12 of the pivoting connection 11 on the plane P has an inclination towards the direction of advance A by following a direction of the ground upward. This inclination is marked by the angle α. FIGS. 2, 5 and 6 represent the machine 1 in a configuration in which it follows a curved course towards the right. The course which is followed causes the hitching device 13 to pivot with respect to the frame 2 about the axis 12, then the angle α causes the hitching device 13 to tilt in a plane substantially vertical and substantially perpendicular to the direction of advance A, and the second end E2 situated on the interior side of the course to be at a greater height than the first end E1. On the majority of tractors, the lower arms 14, 15 are controlled by single-acting jacks and are opposed to a force exerted on them towards the ground, but are not opposed to a force which tends to raise them. Thus, the difference in height between the ends E1 and E2 generates a greater support on the lower arm 14 situated on the exterior side of the course, whilst the lower arm 15 situated on the interior side of the course is relieved.

The result of this is that the sustentation triangle changes with respect to the case, represented in FIG. 1, in which the machine is in a straight line. The new sustentation triangle is represented in FIG. 2. In this case, the second side 17 and the third side 18 both pass through the center M1, thus the sustentation triangle no longer passes through the center M2 since the latter is not subjected to a force towards the ground. The first side 16 remains unchanged.

But, the center of gravity is located in the interior of the sustentation triangle and preferably in the vicinity of a median plane of the frame 2 parallel to the plane P.

Consequently, the center of gravity remains at a certain distance from the third side 18. It must be noted that without the claimed inclination of the axis 12, the second side 17 and the third side 18 could pass through the center M2, which would reduce the distance separating the center of gravity of the third side 18 and would therefore render the machine 1 potentially unstable. On the contrary, the inclined axis 12 renders it improbable that, under normal conditions of use of the machine 1, a lateral acceleration oriented from the second side 17 towards the third side 18—such as the centrifugal acceleration—would cause the center of gravity to leave the sustentation triangle and that the latter would be situated on the exterior of the third side 18.

Thus, when, during transport, the farmer begins to turn, he can maintain a high running speed without the fear of seeing the machine 1 tilt towards the exterior of the curve. It is also possible for him to operate the half-turn maneuvers at the end of the plot of land, at a high speed and with a relatively small turning radius, which improves the handling capability of the machine 1. In addition, a curved course can be negotiated with greater safety, even in the presence of numerous hollows and bumps. A frequent case of use is that in which the tractor 4—machine 1 assembly turns on a sloping field, the side of the machine 1 situated towards the exterior of the curved course being, due to the slope, lower than the opposite side. The inclined axis 12 allows such a maneuver to be operated on a larger slope than a conventional machine would permit.

Preferably, the projection of the axis 12 on the plane P forms in the plane P an angle α less than or equal to 20° with respect to a vertical plane substantially perpendicular to the direction of advance A. An angle value not exceeding 20° allows the torsional stresses on the frame 2 to be kept within reasonable proportions.

The effect of the invention is optimal for an angle value α comprised between 2° and 15°.

Figure 7:
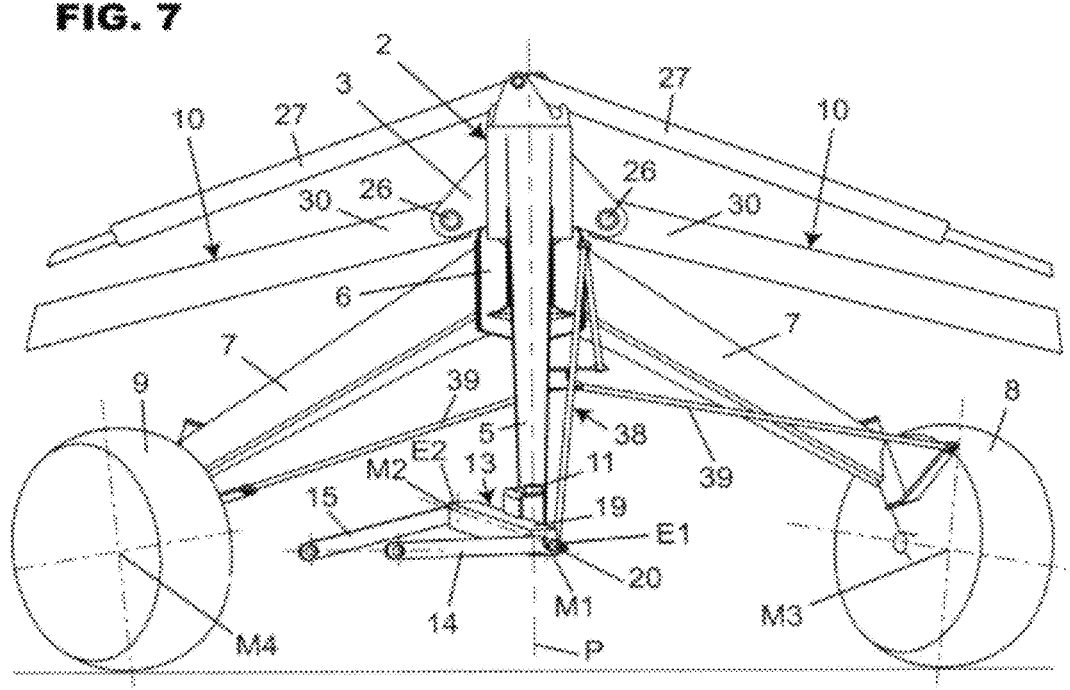
FIG. 7 represents on a larger scale a partial front view of a machine according to the invention, the hitching device of which is another variant embodiment, the hitching device and the wheels being turned so as to follow a curved course towards the right.
Figure 8:
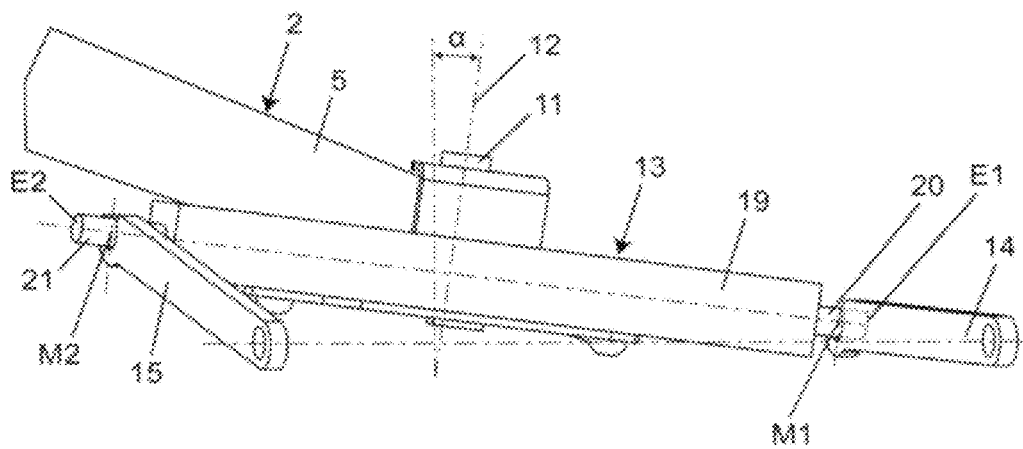
FIG. 8 represents on a larger scale a partial right view of a machine according to the invention, the hitching device of which follows the variant embodiment of FIG. 7, the hitching device and the wheels being turned so as to follow a curved course towards the right.

According to a variant embodiment illustrated by FIGS. 7 and 8, the hitching device 13 comprises a hitching piece 19 which is articulated on the frame 2 by the pivoting connection 11. In addition, the hitching piece 19 comprises towards each of its ends a tenon 20, 21. In this variant embodiment, the end E1 is that of the tenon 20 whilst the end E2 is that of the tenon 21.

Each tenon 20, 21 is configured to come to articulate on the corresponding lower arm 14, 15 of the tractor 4. The articulations thus defined have M1 and M2 as respective centers. The hitching piece 19 can take the form of a bar. Preferably, the axis 12 of the pivoting connection 11 is arranged at a substantially equal distance from the centers M1, M2. Preferably, the pivoting connection 11 and the tenons 20, 21 are substantially aligned. The hitching piece 19 could also take the form of an arch, in which case the pivoting connection 11 and the tenons 20, 21 may not be aligned.

In the above-mentioned variant embodiment, when the hitching device 13 turns with respect to the frame 2 about the pivoting connection 11, one of the tenons 20, 21 is situated at a greater height than the opposite tenon. The result of this is that the opposite tenon generates a force towards the ground on the corresponding lower arm 14, 15, whilst the other lower arm is forced to rise. In FIGS. 7 and 8, the machine 1 is represented in a configuration in which it follows a curved course towards the right. It is apparent there that the center M2 arranged in the interior of the course, is at a greater height than the center M1. The lower arm 15 is therefore raised with respect to the lower arm 14.

This variant embodiment can be economically advantageous for a tractor 4, the lower arms 14, 15 of which have the possibility of rising freely by a certain distance. Thus, it is known to ensure the raising and lowering function of each of the lower arms 14, 15 by means of a single-acting hydraulic jack. The farmer adjusts its height by means of a control lever acting on the hydraulic power unit of the tractor 4. Once its height has been adjusted, the single-acting jack opposes a force being exerted on it towards the ground but can rise again if it is relieved. Each jack is usually completed by a tie-rod which is connected to the corresponding lower arm 14, 15 by an articulation and which has a length which is adjustable manually by the farmer. In the vicinity of this articulation, the tie-rod or the lower arm 14, 15 can be provided with an oblong hole. The latter allows the lower arm 14, 15 to rise freely by a certain distance. Thus, when the hitching device, according to the variant embodiment illustrated by FIGS. 7 and 8, pivots, as previously described, the lower arm 15 can follow the movement upward which the tenon 21 imposes on it.

According to another variant embodiment illustrated by FIGS. 5 and 6, the hitching device 13 comprises a hitching piece 19 and two yokes 22, 23. The hitching piece 19 is articulated on one hand on the frame 2 by the pivoting connection 11 and on another hand on the yokes 22, 23. The hitching piece extends between the first end E1 and the second end E2. The yokes 22, 23 are configured such that they can articulate on the two lower arms 14, 15, thus forming articulations of respective centers M1 and M2. The hitching piece 19 can take the form of a bar, at the ends of which the yokes 22, 23 are articulated. The hitching piece 19 is advantageously provided with a stop 24 arranged in the vicinity of the end E1 and with a stop 25 arranged in the vicinity of the end E2. Each of the stops 24, 25 allows the movement of the corresponding yoke 22, 23 to be limited with respect to the hitching piece 19 along an upward direction. Preferably, the axis 12 of the pivoting connection 11 is arranged at a substantially equal distance from the centers M1, M2. Preferably, the pivoting connection 11 on one hand, the articulations between the yokes 22, 23 and the hitching piece 19 on another hand, are substantially aligned. The hitching piece 19 could also take the form of an arch, in which case the pivoting connection 11 on one hand, the articulations between the yokes 22, 23 and the hitching piece 19 on another hand, may not be aligned.

In the above-mentioned variant embodiment, when the hitching device 13 turns with respect to the frame 2 about the pivoting connection 11, one of the yokes 22, 23 pivots upwards whilst the other yoke pivots downwards, and the lower arms 14, 15 of the tractor 4 remain parallel with each other. In FIGS. 5 and 6, the machine 1 is represented in a position in which it follows a curved course towards the right. The yoke 23, arranged in the interior of the course, is pivoted downwards with respect to the hitching piece 19, whilst the yoke 22 is pivoted upwards. Thus, the arm 15 is relieved, whilst the arm 14 bears a force directed towards the ground.

This variant embodiment is advantageous when the machine 1 is hitched to a tractor 4, the lower arms 14, 15 of which are kept parallel with each other, one not being able to be higher than the other. This parallelism compels the two yokes 22, 23 to pivot as described above.

In addition, the yokes 22, 23 allow the axis 12 of the pivoting connection 11 to be inclined greatly towards the front. In fact, the more marked the inclination, the greater the difference in height which is imposed at the ends E1 and E2 when the frame 2 pivots with respect to the hitching device 13, and the greater the force exerted on the lower arm 14 in support. This contributes to improving the overall efficiency of the invention. Care will then be taken to design yokes 22, 23 to be sufficiently long, i.e. having a sufficiently great distance between the articulation with the hitching piece 19 and the articulation with the lower arm 14, 15.

Furthermore, by the degree of additional freedom which they give to the hitching device 13 in its movements with respect to the lower arms 14, 15, the yokes 22, 23 reduce the mechanical stresses, essentially torsional stresses, which are exerted on the frame 2. In fact, as explained above, when the hitching piece 19 is pivoted with respect to the frame 2, one of its ends is higher than the other, therefore the hitching piece 19 is not parallel to the ground. But, the wheels 8, 9 are always in contact with the ground and the lower arms 14, 15 both remain at the same height with regard to the ground. The yokes 22, 23 prevent the frame 2 from twisting about its longitudinal axis and therefore extend the lifespan of the machine 1.

Figure 10:
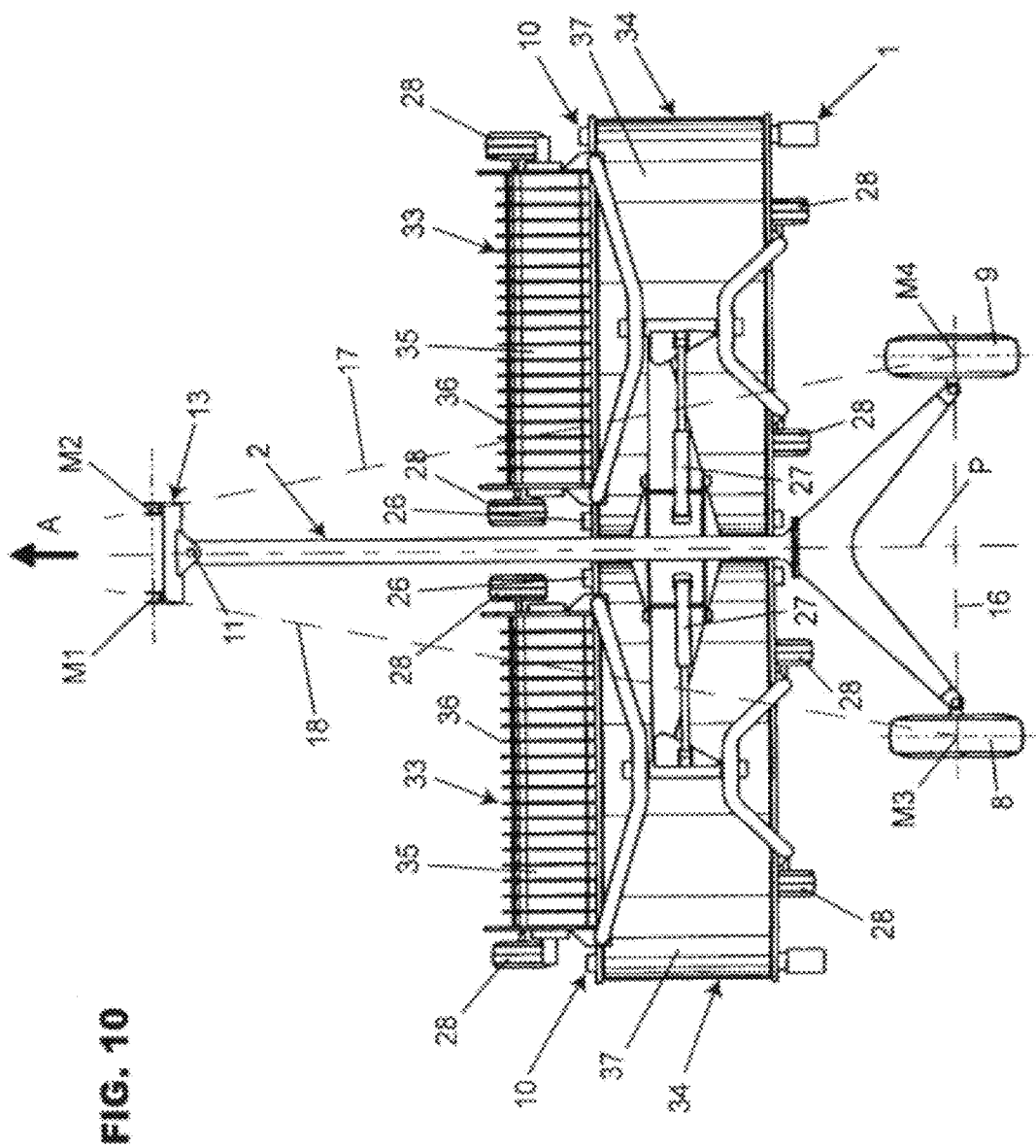
FIG. 10 represents a top view of a variant embodiment of the machine in a straight line.

According to a variant embodiment presented in particular in FIGS. 1 and 10, each work device 10 is arranged between the hitching device 13 and the wheels 8, 9. It is thus possible to have two work devices 10 which are each connected to a side of the frame 2 by an articulation 26 having a substantially horizontal axis. Each articulation 26 permits the corresponding work device 10 to move between a work position and a transport position. This movement is operated by means of a jack 27. Each work device 10 is provided with at least one carrier wheel 28. In the work position, each work device 10 extends following a substantially horizontal plane and following a direction substantially perpendicular to the direction of advance A. The carrier wheel 28 touches the ground. In the transport position, each work device 10 is raised substantially to the vertical so as to reduce the total width of the machine 1. A raised position is also provided, situated between the work position and the transport position. In this position, each work device 10 is raised at a small distance from the ground such that it does not come in contact with the fodder lying on the ground. As represented in FIG. 1, the work devices 10 can be shifted following a direction parallel to the direction of advance A, but they can also—following the example of FIG. 10—be arranged in a substantially symmetrical manner with respect to the frame 2. It can also be envisaged to have four work devices 10 arranged in pairs on either side of the frame 2.

Figure 9:
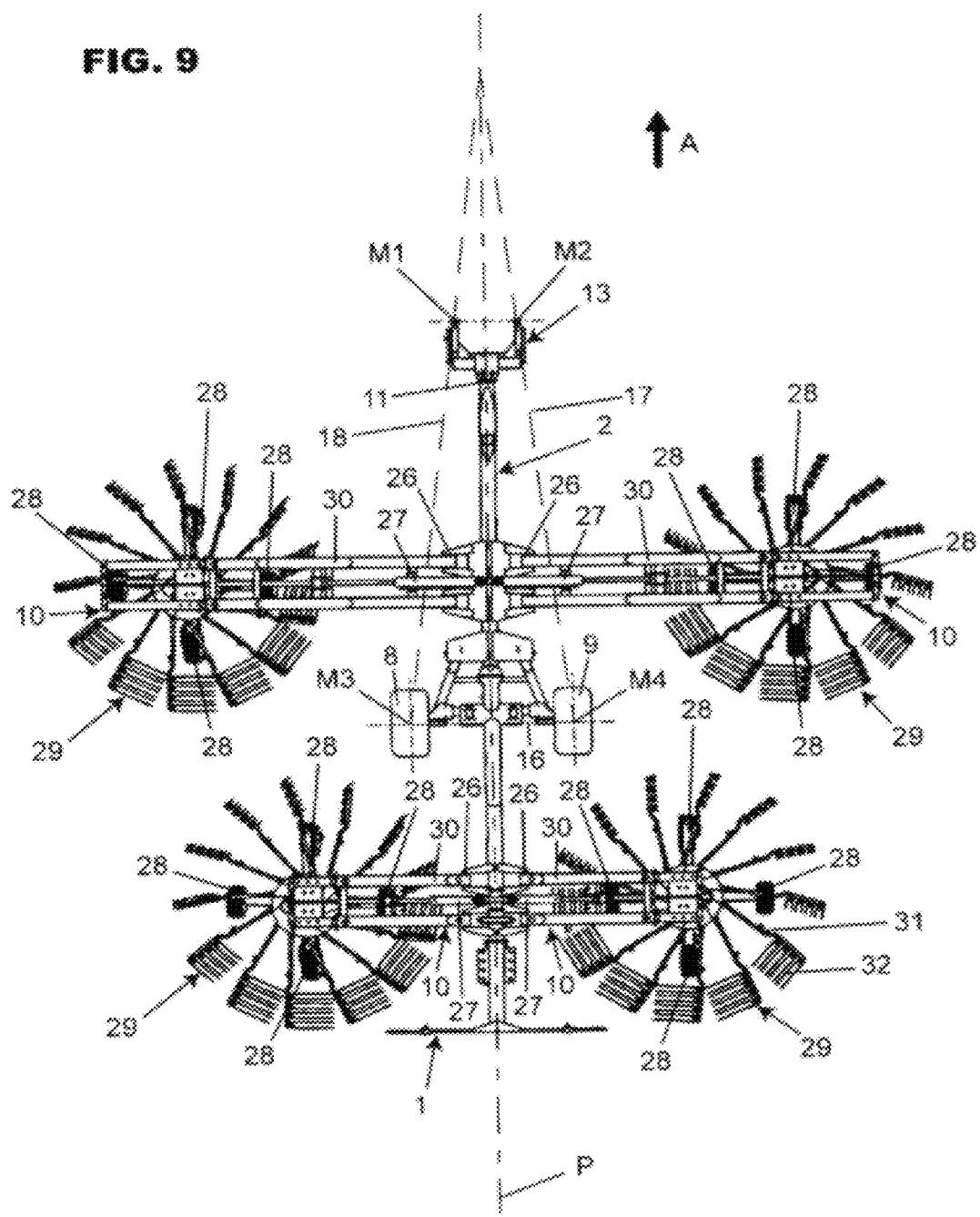
FIG. 9 represents a top view of a variant embodiment of the machine in a straight line.

According to a variant embodiment presented in FIG. 9, the machine 1 comprises at least one work device 10 arranged between the hitching device 13 and the wheels 8, 9, as well as at least one work device 10 arranged at the rear of the wheels 8, 9. In this example, the machine 1 comprises two work devices 10 arranged at the front of the wheels 8, 9 and symmetrically with respect to the frame 2, and also two work devices 10 arranged at the rear of the wheels 8, 9 and symmetrically with respect to the frame 2. Each of the work devices 10 is provided with at least one carrier wheel 28, it is connected to the frame 2 by an articulation 26 having a substantially horizontal axis, and can be moved between a work position, a raised position and a transport position by means of a jack 27. In the transport position, it is raised substantially to the vertical. In the work position, it extends following a substantially horizontal plane and the carrier wheel 28 touches the ground.

In the raised position, the carrier wheel 28 of each work device 10 does not touch the ground. The result of this is that the only wheels which carry the machine 1 are the wheels 8, 9 at the rear of the frame 2. But, the work devices 10 extend laterally much more than the wheels 8, 9 at the rear of the frame 2, which increases the propensity of the machine to tilt laterally when it follows a curved course. The inclined axis 12 then allows the support of the machine 1 to be increased on the lower arm 14, 15 situated on the exterior side to the course. It follows that the machine 1 is more stable on turns negotiated in the raised position.

According to a variant embodiment presented in particular in FIGS. 1 and 9, at least one of the work devices 10 comprises a raking wheel 29 which is driven in rotation from the tractor about a rotation axis which is substantially vertical during work. The raking wheel 29 is carried by an arm 30 which can pivot with respect to the frame 2 by means of the articulation 26 with a substantially horizontal axis. The arm 30 could also be provided with two raking wheels 29. The raking wheel 29 is equipped with tool-carrier arms 31 carrying at their ends work tools 32 such as forks for moving the fodder. The tool-carrier arms 31 can pivot about their respective longitudinal geometric axes so as to form one or several windrows. Alternatively, a raking wheel 29 with non-controlled work tools 32 could equip the machine 1 according to the invention, so as to toss the fodder or else to arrange it in one or several windrows.

According to a variant embodiment shown in FIG. 10, at least one of the work devices 10 comprises a device 33 for gathering plants lying on the ground and at least one device 34 for moving the gathered plants. The gathering device 33 of plants lying on the ground is of the pick-up type. It comprises a rotor 35 with controlled teeth 36 which is driven in rotation such that the teeth 36 gather up the plants at the level of the ground, lift them and throw them in an opposite direction to the direction of advance A. At the rear of the gathering device 33 is situated the device 34 for moving the plants. The latter is situated in the immediate proximity of the gathering device 33, so that it receives the plants thrown towards the rear by this. The moving device 34 is constituted by a conveyor belt 37 which is driven during work such that it moves the plants transversely to the gathering device 33, towards the right side or towards the left side of the machine 1. The plants are then redeposited on the ground in the form of a windrow with a view to subsequently being picked-up again. The machine 1 can comprise several gathering devices 33 and moving devices 34 placed side by side, with a view to increasing its working width.

Preferably, the wheels 8, 9 are directional. To this end, a rod device 38 is provided, represented in particular in FIGS. 1 and 2, which is articulated on the hitching device 13. The rod device 38 includes in particular two rear rods 39, each being connected to a hub carrying a wheel 8, 9. Each hub is articulated on the corresponding divergent support 7 following a substantially vertical axis so that the corresponding wheel 8, 9 can pivot in a substantially horizontal plane. As can be seen from FIG. 2, when the hitching device 13 pivots towards the right with respect to the frame 2, it sets in movement the rod device 38, which then orientates the wheels 8, 9 in the opposite direction, namely towards the left in this example.

The directional wheels 8, 9 reduce the turning radius of the tractor 4—machine 1 assembly and allow the running speed to be increased in a curve, without compromising an operation stability which is already greatly improved by the inclined axis 12 of the pivoting connection 11 with which the machine 1 according to the invention is provided.

It is readily evident that the invention is not limited to the variant embodiments described above and represented in the attached drawings. It can be applied to other machines in the field of haymaking. Modifications remain possible, in particular with regard to the constitution or the number of the various elements or by substitution of technical equivalents without, however, departing from the scope of protection.

What is claimed as new and desired to be secured by Letters Patent of the United States is:

1. An agricultural haymaking machine intended to be hitched to two lower arms of a tractor, comprising:
   a frame supported on the ground by wheels and
   at least one work device connected to the frame,
   the frame including a front part in a pivoting connection with a hitching device configured to be connected to the two lower arms,
   the hitching device comprising a hitching piece extending between two ends, the machine having a center of gravity situated between the wheels and the hitching device,
   wherein the projection of an axis of the pivoting connection on a plane which is substantially vertical and substantially parallel to a direction of advance of the machine has an inclination towards the direction of advance following an upward direction relative to the ground,
   wherein a pivoting of the hitching device with respect to the frame about the axis of the pivoting connection as a result of the machine following a curve having an interior side and an exterior side, causes an interior end of the hitching piece situated on the interior side of the curve to be at a greater height than an exterior end of the hitching piece situated on the exterior side of the curve, and wherein the interior end being at a greater height than the exterior end generates a greater support on the lower arm situated on the exterior side of the curve than on the lower arm situated on the interior side of the curve.

2. The agricultural machine according to claim 1, wherein the projection of the axis on the plane which is substantially vertical and substantially parallel to the direction of advance of the machine forms an angle less than or equal to 20° with respect to a vertical plane substantially perpendicular to the direction of advance.

3. The agricultural machine according to claim 2, wherein the angle is comprised between 2° and 15°.

4. The agricultural machine according to claim 1, wherein the hitching piece is articulated on the frame by the pivoting connection, and the hitching piece comprises two tenons configured such that the two tenons articulate on the two lower arms.

5. The agricultural machine according to claim 1, wherein the hitching device further comprises two yokes, wherein the hitching piece is articulated on the frame by the pivoting connection and the hitching piece is articulated on the two yokes, and wherein the two yokes are configured can articulate on the two lower arms.

6. The agricultural machine according to claim 1, wherein the at least one work device is arranged between the hitching device and the wheels.

7. The agricultural machine according to claim 6, wherein it the machine further comprises at least one work device arranged at the rear of the wheels.

8. The agricultural machine according to claim 6, wherein at least one work device comprises a raking wheel, the rotation axis of which is substantially vertical in the work position.

9. The agricultural machine according to claim 7, wherein at least one work device comprises a raking wheel, the rotation axis of which is substantially vertical in the work.

10. The agricultural machine according to claim 6, wherein the at least one work device comprises:
a gathering device to gather plants lying on the ground, and
a moving device to move the gathered plants,
wherein the moving device is situated close to the gathering device and moves the plants transversely to the gathering device.

11. The agricultural machine according to claim 7, wherein at least one work device comprises:
a gathering device to gather plants lying on the ground, and
a moving device to move the gathered plants,
wherein the moving device is situated close to the gathering device and moves the plants transversely to the gathering device.

12. The agricultural machine according to claim 1, wherein the wheels are directional.

13. The agricultural machine according to claim 1, wherein the direction of advance is toward the hitching piece.

* * * * *